US009768454B2

United States Patent
Nagai et al.

(10) Patent No.: US 9,768,454 B2
(45) Date of Patent: Sep. 19, 2017

(54) CONTROL APPARATUS AND CONTROL METHOD, AND COMBINED POWER GENERATION SYSTEM PROVIDED THEREWITH

(71) Applicant: MITSUBISHI HITACHI POWER SYSTEMS, LTD., Yokohama-shi, Kanagawa (JP)

(72) Inventors: Takuma Nagai, Tokyo (JP); Yuichi Teramoto, Tokyo (JP); Masanori Nishiura, Tokyo (JP); Shigenori Koga, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 243 days.

(21) Appl. No.: 14/472,776

(22) Filed: Aug. 29, 2014

(65) Prior Publication Data

US 2015/0064583 A1 Mar. 5, 2015

(30) Foreign Application Priority Data

Sep. 3, 2013 (JP) ................................. 2013-182095

(51) Int. Cl.
*H01M 8/04* (2016.01)
*H01M 8/04089* (2016.01)
*H01M 8/04014* (2016.01)

(52) U.S. Cl.
CPC .... *H01M 8/04097* (2013.01); *H01M 8/04022* (2013.01); *Y02E 20/16* (2013.01)

(58) Field of Classification Search
None
See application file for complete search history.

(56) References Cited

U.S. PATENT DOCUMENTS

2002/0092287 A1 7/2002 Logvinov et al.
2012/0028158 A1 2/2012 Ooe et al.

FOREIGN PATENT DOCUMENTS

| JP | 60-154471 A | 8/1985 |
| JP | 64-72466 A | 3/1989 |
| JP | 2002-298889 A | 10/2002 |
| JP | 2005-127203 A | 5/2005 |
| JP | 2006-344401 A | 12/2006 |

(Continued)

OTHER PUBLICATIONS

Office Action dated May 2, 2017, issued in counterpart Japanese Application No. 2013-182095, with English translation (6 pages).

*Primary Examiner* — Patrick Ryan
*Assistant Examiner* — Haixia Zhang
(74) *Attorney, Agent, or Firm* — Westerman, Hattori, Daniels & Adrian, LLP

(57) ABSTRACT

A combined power generation system is promptly activated, and stable operation thereof is provided. A control apparatus of the combined power generation system that generates power by performing cooperative operation combining an SOFC and an MGT, in which the combined power generation system includes: an exhaust fuel gas supply line that supplies exhaust fuel gas to a combustor of the MGT from the SOFC; a recirculation line that branches from the exhaust fuel gas supply line to flow the exhaust fuel gas to the SOFC; and a flow rate adjustment valve provided on a path of the exhaust fuel gas supply line, and in which a gain to an opening of the flow rate adjustment valve is adjusted according to an cooperative operation state of the SOFC and the MGT.

7 Claims, 2 Drawing Sheets

(56) References Cited

FOREIGN PATENT DOCUMENTS

| | | | |
|---|---|---|---|
| JP | 2007-294304 | A | 11/2007 |
| JP | 4146411 | B2 | 9/2008 |
| JP | 2009-99310 | A | 5/2009 |
| JP | 2009-205930 | A | 9/2009 |
| JP | 2012-195173 | A | 10/2012 |

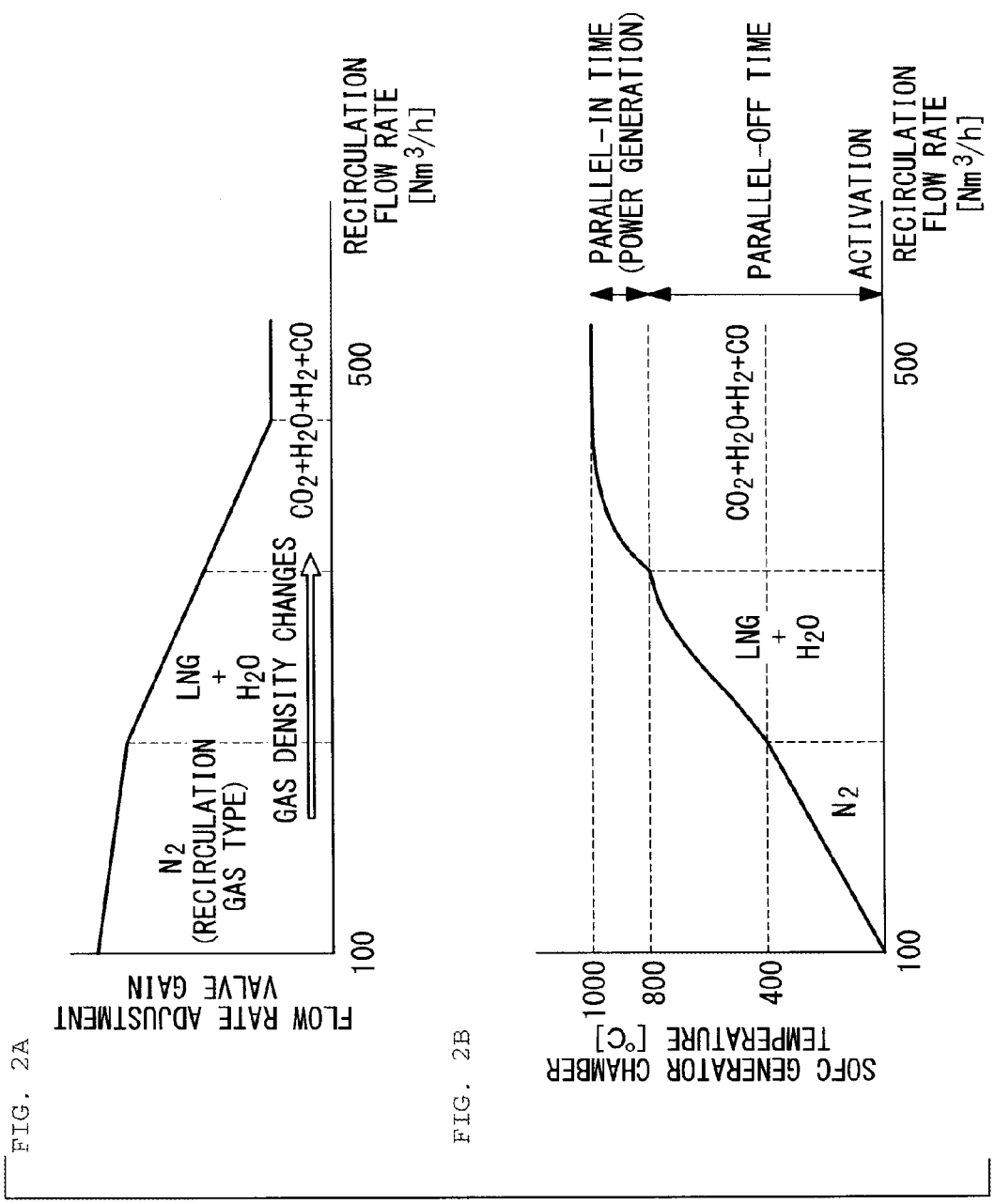

CONTROL APPARATUS AND CONTROL METHOD, AND COMBINED POWER GENERATION SYSTEM PROVIDED THEREWITH

CROSS-REFERENCE TO RELATED APPLICATIONS

This application is based on Japanese Patent Application No. 2013-182095, the contents of which are incorporated herein by reference.

TECHNICAL FIELD

The present invention relates to a control apparatus and a control method, and a combined power generation system provided therewith.

BACKGROUND ART

Fuel cells are power generation apparatuses utilizing a power generation scheme by electrochemical reaction, and have characteristics such as superior power generation efficiency and environmental response. Among these, a solid oxide fuel cell (hereinafter referred to as an "SOFC") is a fuel cell in which ceramics, such as zirconia ceramics, is used as an electrolyte, and that is operated using town gas, natural gas, petroleum, methanol, coal gasification gas, etc. as fuel. Such SOFC can generate power with high power generation efficiency by constructing a combined power generation system combining with an internal combustion engine, such as a micro gas turbine (hereinafter referred to as an "MGT") (refer to the following PTL 1). Specifically, exhaust fuel gas discharged from the SOFC is burned by a combustor, a turbine is driven by combustion gas, and power is generated. As for the combined power generation system, a conventional technology as shown below has been known.

The following PTL 2 discloses that in an air supply apparatus that is installed in a fuel cell power generation plant, and supplies air to a fuel cell, a control amount of a combustion air flow adjustment valve that adjusts a flow rate of supply air is fluctuated, and control action at the time of activation is stabilized.

The following PTL 3 discloses that in activation in a combined power generation system of a solid oxide fuel cell and a gas turbine, a pressure is raised while holding a differential pressure between a fuel side and an air side of the fuel cell within a management value, and that the pressure is raised within a range where differential pressure control follows.

CITATION LIST

Patent Literature

{PTL 1}
Japanese Unexamined Patent Application Publication No. 2009-205930
{PTL 2}
Japanese Unexamined Patent Application Publication No. Sho 64-72466
{PTL 3}
Japanese Unexamined Patent Application Publication No. 2012-195173

SUMMARY OF INVENTION

Technical Problem

By the way, a flow rate of exhaust fuel gas that is discharged from an SOFC and is again supplied to the SOFC without being supplied to an MGT combustor fluctuates in a wide range, for example, from 100 Nm³/h in a case of a minimum amount to 500 Nm³/h in a case of a maximum amount in a process from activation of the SOFC to rated operation thereof. Conventionally, the flow rate of the exhaust fuel gas has been adjusted by opening control of a flow rate adjustment valve 55 and a pressure control valve 45 that are provided on a flow path of the exhaust fuel gas as shown in FIG. 1 of the above-described PTL 1. Even though opening adjustment degrees of the flow rate adjustment valve are the same, flow rate change after adjustment becomes comparatively small when there is a small flow rate of the exhaust fuel gas, and it becomes comparatively large when there is a large flow rate of the exhaust fuel gas. In such a case, there has been a problem in a conventional combined power generation system that when a change amount of a flow rate with respect to opening adjustment of the flow rate adjustment valve fluctuates according to an operation state from the activation of the SOFC to the rated operation, becomes large a differential pressure of an inside and an outside of the cell based on the exhaust fuel gas recirculated in the SOFC, and it takes time to activate the SOFC, or a load is applied to the SOFC. In addition, there has been a need to provide a pressure adjustment valve and to thereby perform opening adjustment along with pressure fluctuation of the flow path of the exhaust fuel gas.

The present invention has been made to solve the above-described problems, and an object thereof is to provide a control apparatus and a control method, and a combined power generation system provided therewith that can promptly activate a combined power generation system, and can provide stable operation.

Solution to Problem

In order to solve the above-described problems, the present invention employs the following solutions.

A first aspect of the present invention is a control apparatus of a combined power generation system that generates power by performing cooperative operation combining a fuel cell and an internal combustion engine, in which the combined power generation system includes: an exhaust fuel gas supply line that supplies exhaust fuel gas to a combustor of the internal combustion engine from the fuel cell; a recirculation line that branches from the exhaust fuel gas supply line to flow the exhaust fuel gas to the fuel cell; and a flow rate adjustment valve provided on a path of the exhaust fuel gas supply line, in which a flow rate of the branched exhaust fuel gas that flows through the recirculation line is controlled by an opening of the flow rate adjustment valve, and in which a gain to the opening of the flow rate adjustment valve is adjusted according to a cooperative operation state of the fuel cell and the internal combustion engine.

According to this configuration, in the control apparatus of the combined power generation system that generates power by performing cooperative operation combining the fuel cell and the internal combustion engine, according to the cooperative operation state of the fuel cell and the internal combustion engine, the gain of the opening of the flow rate adjustment valve provided on the path of the exhaust fuel gas supply line that supplies the exhaust fuel gas to the combustor of the internal combustion engine from the fuel cell is adjusted.

Although it is estimated that fluctuation occurs in a pressure and fluid density of the exhaust fuel gas since the flow rate and components of the exhaust fuel gas that is consumed in the fuel cell and supplied to the internal combustion engine change in a process from activation of the fuel cell to rated operation, the gain of the opening of the flow rate adjustment valve is adjusted according to the cooperative operation state of the combined power generation system, for example, the gain to the opening is set slightly large (a change amount of the flow rate with respect to an adjustment amount of the valve opening is increased), etc. in a state (for example, activation of an SOFC) where the flow rate of the exhaust fuel gas recirculated through the fuel cell is comparatively small. As described above, stable operation of the combined power generation system can be performed promptly and automatically by suppressing change of a pressure, and operability of the combined power generation system can be improved.

In addition, in the first aspect, it is preferable to adjust the gain of the opening of the flow rate adjustment valve according to the gas density of the exhaust fuel gas that flows through the recirculation line and the flow rate of the exhaust fuel gas that flows through the recirculation line.

If the gain of the flow rate adjustment valve is controlled as described above, can be performed feed-forward control according to the flow rate and the gas density of the exhaust fuel gas that is estimated to flow through the recirculation line. Here, the gas density is a value that is determined by a gas composition, a temperature, and a pressure of the exhaust fuel gas.

In addition, in the first aspect, the cooperative operation state of the fuel cell and the internal combustion engine has a plurality of stages of: an activation stage from operation start until power generation; a power generation stage from power generation start to rated power generation start; and a stop stage in which a load has been paralleled off, and the gain of the opening of the flow rate adjustment valve may be adjusted according to each stage.

As described above, the gain is set according to each stage of the cooperative operation state, and thus for example, even if the flow rate of the exhaust fuel gas increases or decreases in the middle of operation, the gain can be set according to an operation state, and the present invention can contribute to stable operation of the combined power generation system.

In addition, in the first aspect, the cooperative operation state of the fuel cell and the internal combustion engine has an activation stage from operation start until power generation and a power generation stage from power generation start to rated power generation start, and a gain to an opening of the flow rate adjustment valve in the activation stage may be set larger than a gain to an opening of the flow rate adjustment valve in the power generation stage.

Although it is estimated that the flow rate of the exhaust fuel gas that flows through the exhaust fuel gas supply line decreases in the activation stage, the flow rate can be increased or decreased with high sensitivity by making the gain larger than in the power generation stage (in which the flow rate of the exhaust fuel gas increases).

In addition, in the first aspect, the gain of the opening of the flow rate adjustment valve may be adjusted according to a power load.

Since the flow rate of the exhaust fuel gas can be decided based on a power load by a function etc., gain adjustment can be performed by using the power load as a parameter after the power generation start.

In addition, in the first aspect, the gas density may be estimated based on a supply amount of fuel gas supplied to the fuel cell, or a power generation amount.

Since approximate gas temperature and pressure can be estimated in a load command at that time, the gain can be decided with a certain degree of accuracy by a supply amount of the fuel gas or a power generation amount.

In addition, in the first aspect, the gas density may be estimated based on at least one of a temperature of the exhaust fuel gas detected in the exhaust fuel gas supply line, and a pressure value detected in the recirculation line.

The gain is decided based on the detected gas temperature and pressure in addition to the supply amount of the fuel gas or the power generation amount, and thereby the gain can be decided with higher accuracy.

A second aspect of the present invention is a combined power generation system provided with a control apparatus described in any of the above.

A third aspect of the present invention is a control method for a combined power generation system that generates power by performing cooperative operation combining a fuel cell and an internal combustion engine, in which the combined power generation system, according to a cooperative operation state of the fuel cell and the internal combustion engine, a gain to an opening of a flow rate adjustment valve provided on a path of an exhaust fuel gas supply line that supplies exhaust fuel gas to a combustor of the internal combustion engine from the fuel cell is adjusted.

Advantageous Effects of Invention

According to the present invention, an effect is exerted that can promptly activate the combined power generation system, and can provide stable operation.

BRIEF DESCRIPTION OF DRAWINGS

FIG. 2A is a graph showing one example of a relation between a recirculation flow rate and a gain to an opening of a flow rate adjustment valve.

FIG. 2B is a graph showing one example of a relation between a recirculation flow rate and a generator chamber temperature of an SOFC.

DESCRIPTION OF EMBODIMENTS

Figure 1:
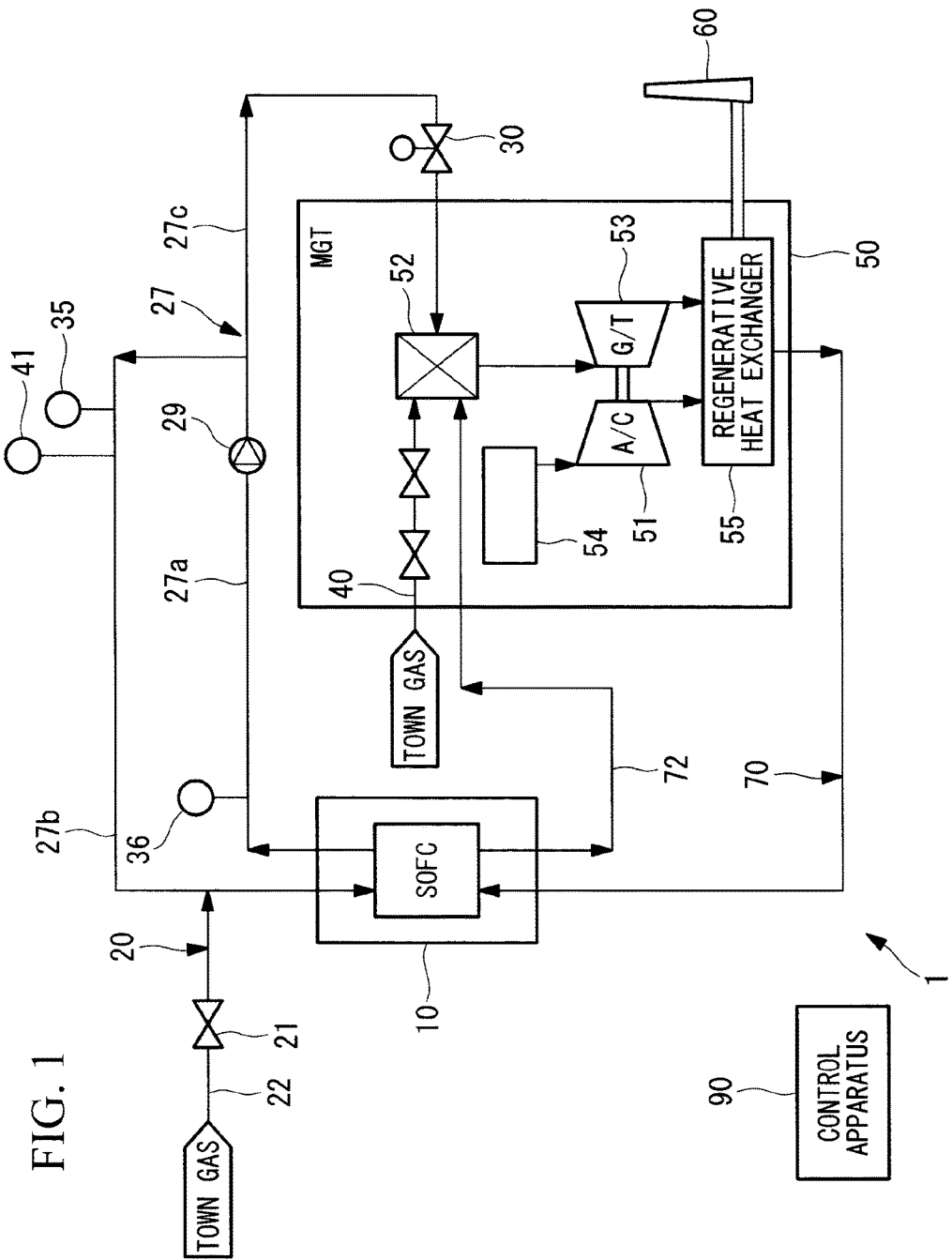
FIG. 1 is a schematic configuration diagram of a combined power generation system according to one embodiment of the present invention.

Hereinafter, with reference to drawings, will be explained one embodiment of a control apparatus and a control method, and a combined power generation system provided therewith according to the present invention.

A combined power generation system (combined power generation system by a fuel cell and an internal combustion engine) 1 shown in FIG. 1 is provided with: an SOFC 10, which is a high-temperature type fuel cell; a micro gas turbine (hereinafter referred to as an "MGT") 50 as one example of a gas turbine or a gas engine, which is the internal combustion engine; and a control apparatus 90, and performs efficient power generation by combining the SOFC 10 and the MGT 50.

Namely, in addition to the SOFC 10 that receives supply of oxidized gas, such as fuel gas obtained by reforming town gas (natural gas) and the air, and generates power according to electrochemical reaction through an electrolyte, the combined power generation system 1 introduces into a combustor high-temperature exhaust fuel and discharge air that are discharged after power generation from the SOFC 10, and operates the MGT 50 by combustion gas, and drives a generator, which is not shown, coupled to an output shaft of the MGT 50 to thereby generate power.

Furthermore, if elevated temperature combustion exhaust gas discharged from the MGT 50 is introduced into an exhaust heat recovery boiler, it is also possible to construct a combined power generation system in which power generation by driving a steam turbine with generated steam has also been combined.

Hereinafter, will be explained the combined power generation system 1 that has employed the above-mentioned SOFC 10. The SOFC 10 is a fuel cell in which operation (power generation) is performed using ceramics, such as zirconia ceramics, as an electrolyte, and utilizing as fuel town gas, natural gas, petroleum, methanol, coal gasification gas, etc., and an operating temperature is set as high as approximately 800 to 1000° C. in order to increase ionic conductivity.

In addition, in the following explanation, although a case will be explained where town gas is used as fuel by reforming it outside or inside the SOFC 10, and where the air is used as oxidized gas, the air in this case is compressed air supplied from the MGT 50. Alternatively, an air compressor may be separately provided to thereby supply the air.

As shown in FIG. 1, the MGT 50 is provided with: a compressor 51; a combustor 52; and a turbine 53. Note that a reference numeral 54 in FIG. 1 denotes a filter, and that a reference numeral 55 denotes a regenerative heat exchanger.

The compressor 51 compresses the atmosphere (air) introduced through the filter 54, and a drive source in this case serves as the turbine 53. The compressed air compressed by the compressor 51 is supplied to the SOFC etc. through the combustor 52 as combustion air or the regenerative heat exchanger 55 as the oxidized gas.

The combustor 52 receives supply of the compressed air, burns the town gas of fuel, generates elevated temperature and high-pressure combustion exhaust gas, and supplies it to the turbine 53. To the combustor 52, connected are an exhaust fuel gas supply line 27c that supplies exhaust fuel gas from the SOFC 10, which will be mentioned later, and a fuel gas supply system 40 that supplies unused town gas (fuel gas).

The turbine 53 rotates by energy of the combustion exhaust gas from the combustor 52 to generate shaft output power, and the compressor 51 and the generator, which is not shown, are driven utilizing the shaft output power.

The combustion exhaust gas that has worked in the turbine 53 is heat-exchanged with the compressed air by the regenerative heat exchanger 55, and subsequently is released from a chimney 60 to the atmosphere.

The combined power generation system 1 is a system that performs power generation combining the SOFC 10 and the MGT 50, and is provided with a fuel supply system 20 that supplies fuel to a fuel electrode of the SOFC 10, and an oxidized gas supply system 70 that supplies oxidized gas to an air electrode thereof. The fuel supply system 20 is provided with a town gas (fuel gas) supply line 22 provided with a town gas supply valve (opening and closing valve) 21. In addition, although only the town gas supply line 22 is described as the fuel supply system 20 in FIG. 1, a material supplied from the fuel supply system 20 to the SOFC 10 is not limited to town gas, but included are nitrogen, steam (water), etc. that are supplied from a line, which is not shown.

The illustrated fuel gas discharge system 27 is a flow path through which the exhaust fuel gas that has been supplied to the SOFC 10 and has been utilized for power generation is fed to the MGT 50, or is recirculated through the SOFC 10. The fuel gas discharge system 27 is configured with: an exhaust fuel gas line 27a that has an exhaust fuel blower 29; a recirculation line 27b that recirculates exhaust fuel gas through the SOFC 10 via the exhaust fuel gas line 27a; the exhaust fuel gas supply line 27c that is connected to the MGT 50 via the exhaust fuel gas line 27a.

In the fuel gas discharge system 27, the recirculation line 27b is a flow path for returning (recirculating) the exhaust fuel gas of the SOFC 10 to the fuel supply system 20. In addition, a flow rate detection unit 41 that detects a recirculation flow rate of the exhaust fuel gas is provided at the recirculation line 27b, and a value of the detected recirculation flow rate is used as a value when generating gain information on an opening of a flow rate adjustment valve 30, which will be mentioned later.

The exhaust fuel gas supply line 27c is a flow path that supplies the exhaust fuel gas to the combustor 52 of the MGT 50 from the SOFC 10 through the flow rate adjustment valve 30.

Note that a pressure sensor 35 is provided at the recirculation line 27b, and that a temperature sensor 36 is provided at the exhaust fuel gas line 27a.

The illustrated oxidized gas supply system 70 is a flow path that supplies to the air electrode of the SOFC 10 the compressed air (oxidized gas) that has been compressed by the compressor 51 of the MGT 50 and has been heat-exchanged by the regenerative heat exchanger 55.

In addition, an oxidized gas discharge system 72 is a flow path that supplies to the MGT 50 exhaust oxidized gas that has been supplied to the SOFC 10 and has been utilized for power generation, and couples between the SOFC 10 and the MGT 50.

The control apparatus 90 is configured with: a CPU (Central Processing Unit), which is not shown; a RAM (Random Access Memory); a computer-readable recording medium; etc. A process of a series of processings for achieving after-mentioned various functions is recorded on a recording medium etc. in the form of a program, and the CPU reads this program to the RAM etc., to execute processing and arithmetic processing of information, and thereby the after-mentioned various functions are achieved.

The control apparatus 90 adjusts a gain to an opening of the flow rate adjustment valve 30 according to a cooperative operation state of the SOFC 10 and the MGT 50. Specifically, the control apparatus 90 has "gain information" in which a flow rate (recirculation flow rate) and gas density of the exhaust fuel gas flowing through the recirculation line 27b are made to correspond to the gain given to the opening of the flow rate adjustment valve 30, and precedingly performs feed-forward control of the flow rate adjustment valve 30 by the gain made to correspond to the recirculation flow rate and the gas density that are estimated to flow through the recirculation line 27b according to the cooperative operation state. Here, the gas density is a value that is determined by a gas composition, a temperature, and a pressure of the exhaust fuel gas.

In FIG. 2A, one example of the gain information is shown, the recirculation flow rate that flows through the recirculation line 27b is shown on a horizontal axis, and one example of the gain given to the opening of the flow rate adjustment valve 30 that is decided based on the recirculation flow rate is shown on a vertical axis.

A left end of the horizontal axis of FIG. 2A denotes a recirculation flow rate (for example, 100 Nm³/h) of the exhaust fuel gas that flows to the recirculation line 27b at the time of activation start of the SOFC 10, and a right end of the horizontal axis denotes a recirculation flow rate (for example, 500 Nm³/h) of the exhaust fuel gas that flows through the recirculation line 27b after the rated operation of the SOFC 10. In the present embodiment, a case will be explained taking as an example where the recirculation flow rate of the exhaust fuel gas that flows through the recirculation line 27b gradually increases in a process from the activation of the SOFC 10 to the rated operation thereof. Here, the case will be explained assuming that the cooperative operation state of the SOFC 10 and the MGT 50 has a plurality of stages of: a start stage from operation start until power generation (for example, a nitrogen cut-off valve is open, a temperature is less than 800° C.); a power generation stage from power generation start to rated power generation start (for example, the temperature is not less than 800 and not more than 950° C. (rating)); and a stop stage in which a load has been paralleled off (for example, the load is paralleled off (the temperature is less than 850° C.).

In addition, in FIG. 2A, gas density of the exhaust fuel gas is shown together, and a situation is shown where a gas composition in the activation stage of the SOFC 10 is mainly nitrogen $N_2$, the gas is reformed and the gas composition is changed as operation proceeds and a generator chamber temperature rises, and where the gas is decomposed into liquefied natural gas LNG and water $H_2O$, and contains carbon dioxide $CO_2$, water $H_2O$, hydrogen $H_2$, and carbon monoxide CO near the rated operation.

Note that gas density may be estimated based on a supply amount of the fuel gas supplied to the SOFC 10, or a power generation amount. Since approximate gas temperature and pressure can be estimated in a load command at that time, a gain can be decided with a certain degree of accuracy only by the supply amount of the fuel gas or the power generation amount.

Furthermore, the gas density may be estimated based on at least one of a temperature of the exhaust fuel gas detected in the exhaust fuel gas supply line 27c, and a pressure value detected in the recirculation line 27b. The gain is decided based on the detected gas temperature and pressure in addition to the supply amount of the fuel gas or the power generation amount, and thereby the gain can be decided with higher accuracy.

In addition, components having highest content ratios are represented in the gas density shown in FIG. 2A, and the graph means balance of the components gradually changes before and after dotted lines in the graph, and does not mean that the composition rapidly changes.

In addition, FIG. 2B is one example showing a recirculation flow rate of the exhaust fuel gas that flows through the recirculation line 27b on a horizontal axis, and a generator chamber temperature of the SOFC 10 on a vertical axis, and is made to correspond to FIG. 2A. Generator chamber temperatures of 0° C. to approximately 800° C. of the vertical axis show a parallel-off time from activation of the SOFC 10 until power generation start (a state where the SOFC 10 has not generated power), and generator chamber temperatures of 800° C. to 1000° C. of the vertical axis show a parallel-in time when the SOFC 10 performs power generation (a state where the SOFC 10 has generated power).

As shown in FIG. 2A of the present embodiment, the gain to the opening of the flow rate adjustment valve 30 in the activation stage (parallel-off time) is preferably set larger than the gain to the opening of the flow rate adjustment valve 30 in the power generation stage in a case where the recirculation flow rate increases according to progression of the cooperative operation state. That is, when there is a small flow rate of the exhaust fuel gas, it is preferable to improve sensitivity (a change amount of a flow rate with respect to an adjustment amount of a valve opening) of the flow rate adjustment valve 30.

Note that the gain information used in the present embodiment is the information that is calculated based on a past actual result etc., and is made to store in a storage means of the control apparatus 90, etc., and that it is read as required during the cooperative operation of the SOFC 10 and the MGT 50, and is used for feed-forward (preceding) control. Therefore, feed-forward control of the sensitivity of the flow rate adjustment valve 30 can be performed according to the gas density of the exhaust fuel gas in a process from the activation stage to the rated operation through the power generation stage.

Note that a setting method of the gain in the power generation stage is not limited to the above.

For example, a point is noted where load power after power generation can be determined" by a function of the recirculation flow rate, and the control apparatus 90 may be provided with a relational expression to calculate the recirculation flow rate based on the load power, may have the gain information with which the gain of the opening of the flow rate adjustment valve 30 can be decided according to the load power, and may adjust the gain of the opening of the flow rate adjustment valve 30 according to the load power.

In addition, although the gain shown in FIG. 2A is explained taking as an example a case of linearly changing according to the recirculation flow rate, the present invention is not limited to this and, for example, a gain may be set that changes in a step manner (gradually) according to the recirculation flow rate.

Next, an action of the combined power generation system 1 according to the present embodiment will be explained using FIGS. 1, 2A, and 2B.

In the cooperative operation (combined operation) of the SOFC 10 and the MGT 50 of the combined power generation system 1, the town gas, which is fuel, is put in the SOFC 10, and chemical energy of the fuel is directly converted into electric power in the SOFC 10. After that, the exhaust fuel gas from the SOFC 10 is supplied to the combustor 52 of the MGT 50. Meanwhile, the air introduced through the filter 54 is supplied to the SOFC 10 after a pressure thereof is raised by the compressor 51 of the MGT 50, a part of the air is used as an oxidizing agent (oxidized gas), subsequently, the remaining air is sent again to the MGT 50 with high temperature exhaust heat, and sensible heat and a pressure of the air are also converted into electric power as energy at the downstream MGT 50 side, whereby it becomes possible to obtain high power generation efficiency in the whole system.

In the control apparatus 90, in a storage means etc., stored is the gain information in which the recirculation flow rate of the recirculation line 27b and the gain of the opening of the flow rate adjustment valve 30 are made to correspond to each other based on various information measured and collected by the time when the combined power generation system 1 has become the cooperative operation state from activation.

In the stage where the SOFC 10 of the combined power generation system 1 is activated, the gain information is read from the control apparatus 90, and read is a gain corresponding to a recirculation flow rate estimated to be currently flowing through the recirculation line 27b. The gain read corresponding to the opening of the flow rate adjustment valve 30 is applied, and the opening of the flow rate adjustment valve 30 is adjusted by feed-forward control (for example, when there is a small recirculation flow rate in the activation stage (parallel-off time), the gain is set slightly large in order to sensitively fluctuate the flow rate according to valve opening adjustment).

When power generation of the SOFC 10 is started, after starting power generation, the gain to the recirculation flow rate of the exhaust fuel gas estimated to be flowing through the recirculation line 27b is read, the gain read with respect to the opening of the flow rate adjustment valve 30 is applied, and the opening of the flow rate adjustment valve 30 is adjusted (for example, when there is a large recirculation flow rate, the gain is set slightly small in order to suppress flow rate fluctuation according to the opening adjustment).

As having explained above, according to the control apparatus 90 and the control method, and the combined power generation system 1 provided therewith according to the present embodiment, although it is estimated that fluctuation occurs in a pressure and fluid density of the exhaust fuel gas since the flow rate and components of the exhaust fuel gas that is consumed in the SOFC 10 and supplied to the MGT 50 change in a process from activation of the SOFC 10 to rated operation thereof, the gain of the opening of the flow rate adjustment valve 30 is adjusted according to the cooperative operation state of the combined power generation system 1, for example, the gain to the opening is set slightly large (namely, the flow rate is sensitively changed according to the opening adjustment), etc. in a state (for example, activation of the SOFC) where the flow rate of the exhaust fuel gas is comparatively small. Consequently, change of a pressure can be suppressed to thereby promptly and automatically perform stable operation of the combined power generation system 1, and operability of the combined power generation system 1 can be improved. In addition, since the change of the pressure can be suppressed, a pressure adjustment valve that is conventionally needed and is provided on the flow path of the exhaust fuel gas becomes unnecessary.

Modification

Note that although in the present embodiment, the case has been explained as the example where the recirculation flow rate increases in order in the process from the activation of the SOFC 10 to rating thereof, the present invention is not limited to this. For example, the recirculation flow rate may increase or decrease in the process from the activation of the SOFC 10 to the rating thereof. In such a case, respective gain information for adjusting the gain of the opening of the flow rate adjustment valve 30 is provided in the control apparatus 90 according to each stage of the activation stage, the power generation stage, and the stop stage of the cooperative operation state of the SOFC 10 and the MGT 50, and gain adjustment of the opening of the flow rate adjustment valve 30 may be performed according to each stage based on the gain information.

Note that the present invention is not limited to the above-mentioned embodiment, and that it can be appropriately changed without departing from the scope of the invention.

REFERENCE SIGNS LIST

1 Combined power generation system (Fuel cell/gas turbine power generation system)
10 SOFC (Solid Oxide Fuel Cell)
20 Fuel supply system
21 Town gas supply valve (Opening and closing valve)
22 Town gas (Fuel gas) supply line
27 Fuel gas discharge system
27a Exhaust fuel gas line
27b Recirculation line
27c Exhaust fuel gas supply line
29 Exhaust fuel blower
30 Flow rate adjustment valve
35 Pressure sensor
36 Temperature sensor
40 Fuel gas supply system
50 MGT (Micro Gas Turbine)
51 Compressor
52 Combustor
53 Turbine
60 Chimney
70 Oxidized gas supply system
72 Oxidized gas discharge system
90 Control Apparatus

The invention claimed is:

1. A control apparatus of a combined power generation system that generates power by performing cooperative operation combining a fuel cell and an internal combustion engine, wherein
the combined power generation system comprises:
an exhaust fuel gas supply line that supplies exhaust fuel gas to a combustor of the internal combustion engine from the fuel cell;
a recirculation line that branches from the exhaust fuel gas supply line to flow the exhaust fuel gas to the fuel cell; and
a flow rate adjustment valve provided on a path of the exhaust fuel gas supply line, wherein
a flow rate of the branched exhaust fuel gas that flows through the recirculation line is controlled by an opening of the flow rate adjustment valve,
the control apparatus comprising:
a storing unit that stores gain information for adjusting a gain to the opening of the flow rate adjustment; and
an adjustment unit that adjusts the gain to the opening of the flow rate adjustment valve according to a cooperative operation state of the fuel cell and the internal combustion engine.

2. The control apparatus of the combined power generation system according to claim 1, wherein the gain of the opening of the flow rate adjustment valve is adjusted according to gas density of the exhaust fuel gas that flows through the recirculation line and the flow rate of the exhaust fuel gas that flows through the recirculation line.

3. The control apparatus of the combined power generation system according to claim 1, wherein the cooperative operation state of the fuel cell and the internal combustion engine has a plurality of stages of: an activation stage from operation start until power generation; a power generation stage from power generation start to rated power generation start; and a stop stage in which a load is paralleled off, and the gain of the opening of the flow rate adjustment valve is adjusted according to each stage.

4. The control apparatus of the combined power generation system according to claim 1, wherein the cooperative operation state of the fuel cell and the internal combustion engine has an activation stage from operation start until power generation and a power generation stage from power generation start to rated power generation start, and a gain to an opening of the flow rate adjustment valve in the activation stage is set larger than a gain to an opening of the flow rate adjustment valve in the power generation stage.

5. The control apparatus of the combined power generation system according to claim 1, wherein the gain of the opening of the flow rate adjustment valve is adjusted according to a power load.

6. The control apparatus of the combined power generation system according to claim 1, wherein gas density is estimated based on a supply amount of fuel gas supplied to the fuel cell, or a power generation amount.

7. The control apparatus of the combined power generation system according to claim 6, wherein the gas density is estimated based on at least one of a temperature of the exhaust fuel gas detected in the exhaust fuel gas supply line, and a pressure value detected in the recirculation line.

\* \* \* \* \*